United States Patent [19]

Coury et al.

[11] Patent Number: 4,873,308
[45] Date of Patent: Oct. 10, 1989

[54] BIOSTABLE, SEGMENTED ALIPHATIC POLYURETHANES AND PROCESS THEREFOR

[75] Inventors: Arthur J. Coury, St. Paul; Christopher M. Hobot, Mound; Kurt Carlson, Osseo, all of Minn.

[73] Assignee: Medtronic, Inc., Minneapolis, Minn.

[21] Appl. No.: 251,418

[22] Filed: Sep. 30, 1988

[51] Int. Cl.[4] .............................................. C08G 18/75
[52] U.S. Cl. ........................................ 528/75; 528/85
[58] Field of Search ..................................... 528/75, 85

[56] References Cited

U.S. PATENT DOCUMENTS

| 4,098,773 | 7/1978 | Illers et al. | 528/65 |
| 4,191,818 | 3/1980 | Illers et al. | 528/44 |
| 4,521,582 | 6/1985 | Goyert et al. | 528/67 |

OTHER PUBLICATIONS

Article entitled "Biomedical Uses of Polyurethanes", by Arthur J. Coury et al, published in *Advances in Urethane Science and Technology*, vol. 9, Edited by Kurt C. Frisch and Daniel Klempner, Lancaster, PA, Technomic, 1984, pp. 130–168.

*Primary Examiner*—Maurice J. Welsh
*Attorney, Agent, or Firm*—Reed A. Duthler; Joseph F. Breimayer; Grady J. Frenchick

[57] ABSTRACT

Highly stable, segmented, aliphatic polyurethanes prepared by particular processes are disclosed. The segmented polyurethanes of this invention are substantially free of ester and ether linkages and are found to be particularly hydrolytically and oxidatively stable. The polyurethanes of this invention are prepared by a particular two stage process involving the formation of a prepolymer and subsequent reaction with simultaneously or sequentially added diisocyanate and diol monomers.

17 Claims, 2 Drawing Sheets

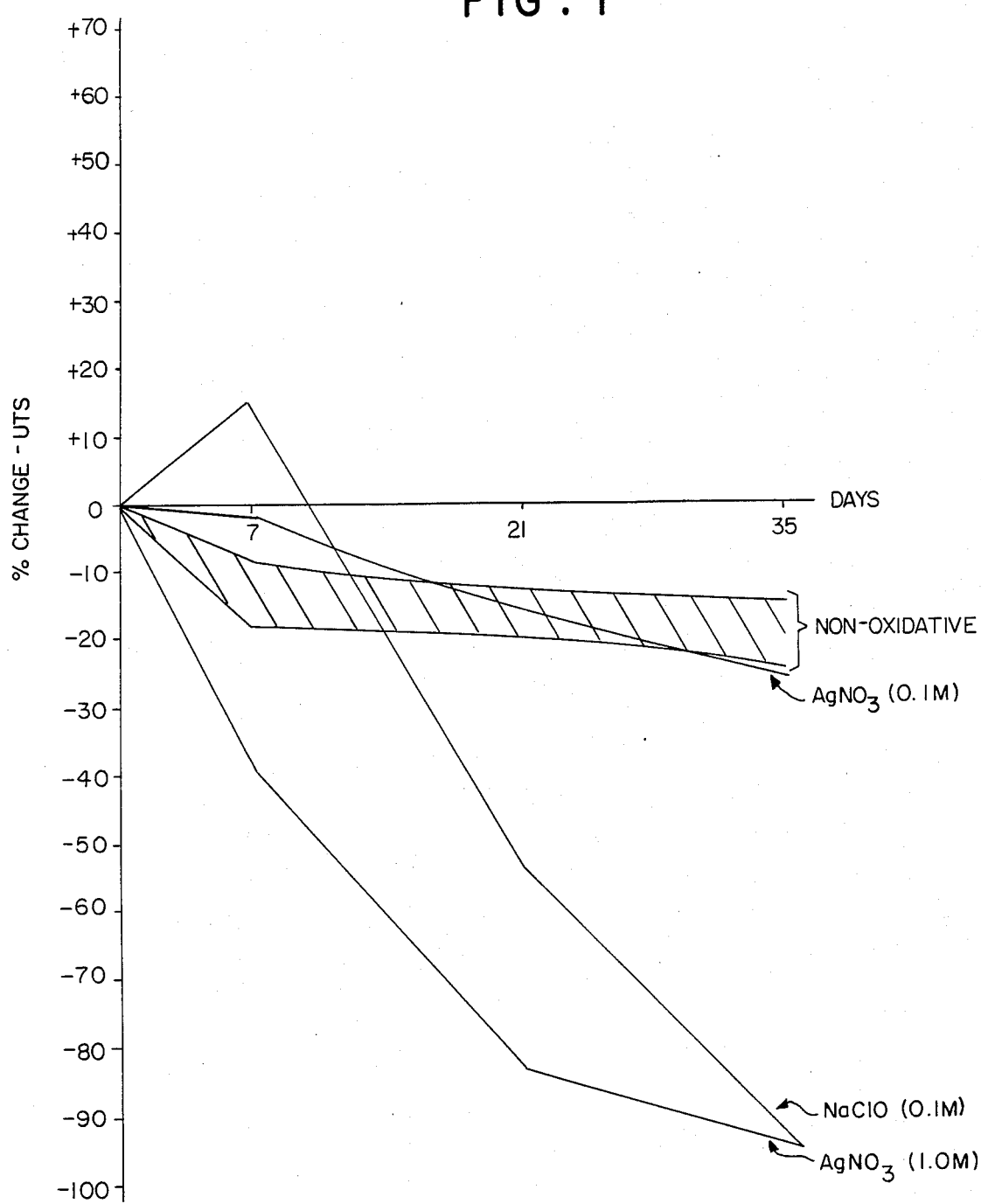

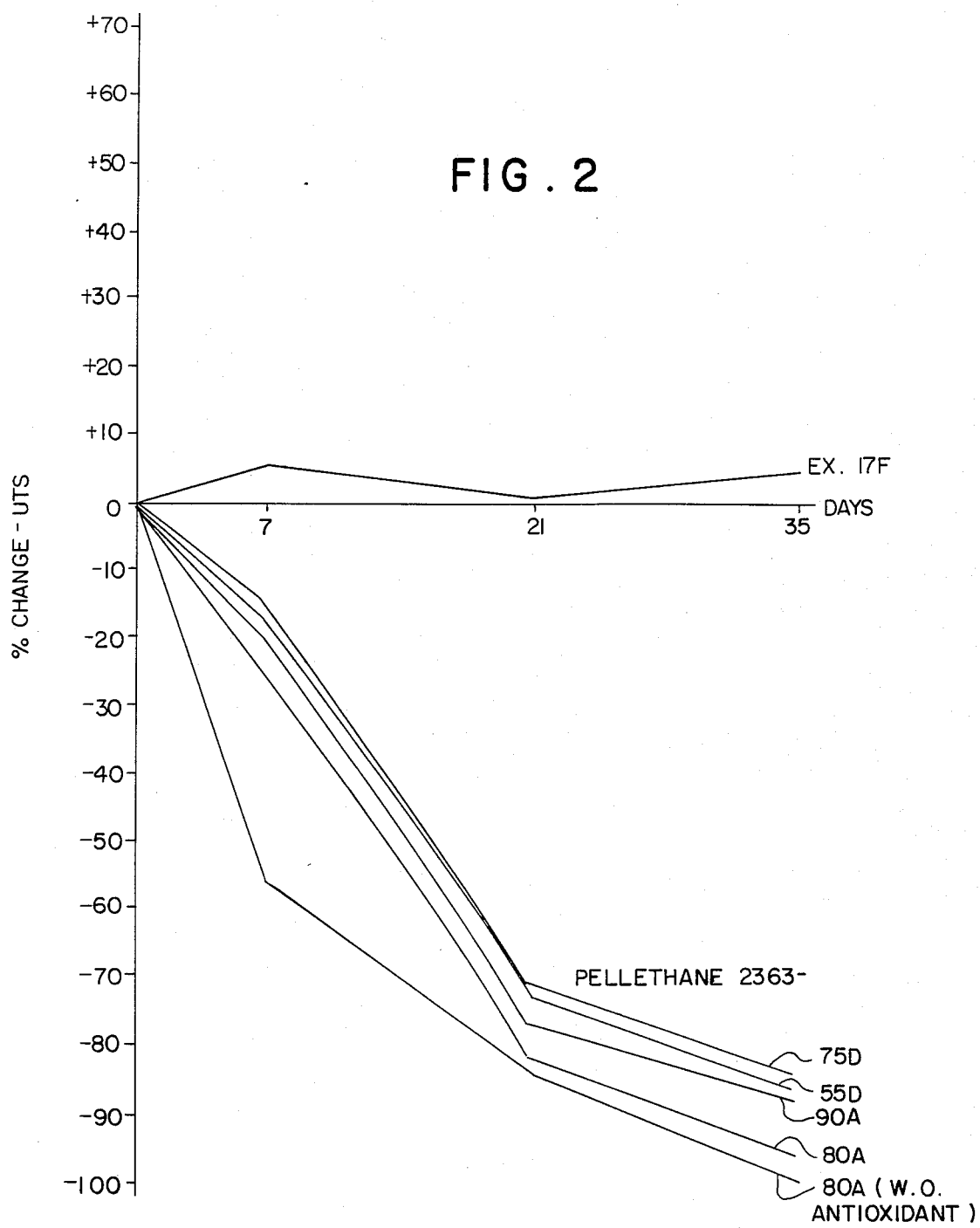

BIOSTABLE, SEGMENTED ALIPHATIC POLYURETHANES AND PROCESS THEREFOR

CROSS REFERENCE TO COMMONLY ASSIGNED CO-PENDING APPLICATION

Reference is made to U.S. patent application Ser. No. 655,273 for a "BIOMEDICAL APPARATUS HAVING FATTY ACID DIMER-DERIVED SKIN COMPATIBLE ADHESIVE COMPOSITION THEREON", filed Sept. 26, 1984, by Jevne, Coury and Cahalan, subsequently replaced by continuation application Ser. No. 143,259, filed Jan. 4, 1988, which in turn was replaced by Ser. No. 256,086, filed Oct. 4, 1988.

BACKGROUND OF THE INVENTION

This invention relates to novel, environmentally stable segmented aliphatic polyurethanes and methods or processes of making same.

The chemistry of urethanes and polyurethanes is, of course, extensive and well developed. For some period of time, polyurethane materials, such as materials sold by Dow Chemical Co. under the trade designation Pellethane ®, have been used for implantable biomedical applications. Pellethane ® 2363-80A and 2363-55D are widely used polyurethanes particularly for implantable cardiac pacing leads.

There also is an extensive polyurethane patent art. U.S. Pat. Nos. 4,191,818, 4,521,582, 4,098,773, among others, are representative of numerous examples of this art. U.S. Pat. No. 4,191,818 to Illers et al relates to polyurethane elastomers made by a process in which a polyisocyanate is reacted with a polyol of high molecular weight with an OH:NCO ratio of 1:0.66 to 1:0.85. The resulting prepolymer is further reacted with an excess of symmetrical diisocyanate and a diol chain extender.

U.S. Pat. No. 4,521,582 to Goyert et al relates to novel, thermoplastically processed branched polyurethane based on naphthylene-1,5-diisocyanate. The process of Goyert et al involves the reaction of a long chain polyester, polyether or polycarbonate polyol with substoichiometric quatities of any diisocyanate other than naphthylene-1,5-diisocyanate. The resulting prepolymer then is further reacted with excess naphthylene-1,5-diisocyanate and with a chain lengthening mixture of short-chain diols and triols or polyols in specific ratios.

U.S. Pat. No. 4,098,773 also to Illers et al concerns a process for making heat resistant polyurethane elastomers in which a substantially linear poly-hydroxyl, polyether, polyester or polycarbonate compound is reacted with diisocyanate material in amounts to give an OH:NCO ratio of 1:1.10 to 1:2 and reacting the resulting adduct with symmetrical aromatic diisocyanate and a diol as chain extender.

Polyurethanes presently used for implantable applications include Biomer ® segmented polyurethane, manufactured by Ethicon, Inc., of Sommerville, NJ, Cardiothane TM polyurethanes, sold by Kontron, Inc., Pellethane ® polyurethanes, sold by Dow Chemical, and Tecoflex TM polyurethanes sold by Thermedics, Inc. These polyurethanes and others are described in the article "Biomedical Uses of Polyurethanes", by Coury et al, in *Advances in Urethane Science and Technology*, Vol. 9, edited by Kurt C. Frisch and Daniel Klempner, Technomic Publishing Co., Lancaster, PA, 1984, pp. 130–168. These pages are incorporated herein by reference in their entirety.

BRIEF SUMMARY OF THE INVENTION

The present invention relates to methods for making oxidatively, hydrolytically stable, segmented, aliphatic polyurethanes which are intentionally free of ester and ether linkages and to the polyurethanes produced. The polyurethanes disclosed are also preferably free of aromatic segments and are structurally suitable for use in implantable medical devices and other medical products which contact body tissues. Some of the polyurethanes disclosed are particularly optimized for use in implantable electrical leads.

The polyurethanes of the present invention are preferably fabricated using a two stage process. The first stage of the process comprises mixing a dimer acid derived diisocyanate and medium and short chain diols to produce a hydroxyl terminated prepolymer. The second stage comprises combining the prepolymer with a short to medium chain diisocyanate and a short to medium chain diol or diols, in an amount to produce a substantially balanced linear polymer. All isocyanates and diols used are chosen to be free of ether and ester linkages.

DETAILED DESCRIPTION OF THE INVENTION

Polyurethanes according to the present invention are comprised substantially of alternating relatively soft segments and relatively hard segments. Both the harder and softer segments are themselves ether and ester free polyurethanes, preferably fabricated by reacting diisocyanates with diols.

The softer segments are preferably based upon the hydrocarbon backbones of dimer acid derivatives, linked by urethane groups to short and/or medium chain length hydrocarbon moieties.

The dimer acids are described and discussed in the book "The Dimer Acids" edited by Edward C. Leonard, published by *Humko Shefield Chemical*, 1975, incorporated by reference herein in its entirety. Dimer acids are the reaction product of a Diels-Alder addition or other coupling reaction of two aliphatic, unsaturated predominantly 18 carbon fatty acids. Dimer acids take the form of single or double ring structures or branched chain hydrocarbon structures, having a variety of structural formulas. A common structural formula is indicated below.

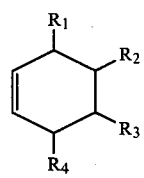

In the monocyclic structure, head to head addition results in adjacent R groups, for example, $R_1$ and $R_2$ or $R_3$ and $R_4$ terminated by carboxyl groups. Head to tail addition results in alternating R groups having carboxyl terminations. Dicyclic dimer acids may also be present in lesser amounts. A commercial form of dimer acid consists of hydrogenated, distilled dimer acid. In this form, dimer acid is largely a saturated acid, and includes trace amounts of the monomer 18 carbon saturated and unsaturated fatty acids and contains monomers and addition products of lower (e.g. $C_{14}$–$C_{16}$) and higher (e.g. $C_{20}$) weight acids. It may also include small amounts of other oligomers of the monomeric fatty acids, including trimers, tetramers and pentamers.

Preferably, the softer segments of polyurethanes according to the present invention consist of the hydrocarbon backbones of dimer acid derivatives alternating with short to medium chain hydrocarbon moieties and linked to them by urethane groups. The softer segments may be produced by reacting either a diol derivative of dimer acid or a diisocyanate derivative of dimer acid with short to medium chain diols or diisocyanates. Due to the commercial availability of dimer isocyanate, it is anticipated that in most cases the first segments will be fabricated using dimer isocyanate and short to medium chain length diols. However, reaction of diol derivatives of dimer acid with short to medium chain diisocyanates is also considered appropriate.

Dimer isocyanate is a readily commercially available product, in which the hydrocarbon backbones of dimer acid have two of their R groups terminated in isocyanate groups rather than carboxylic acid groups. For purposes of the present invention, it is believed desirable to secure as pure a supply of dimer isocyanate as is possible, with only very limited quantities of trimer, monomer and other oligomers. The hydrocarbon backbones of dimer acid are believed particularly advantageous for incorporation in the relatively softer segments of a segmented polyurethane. Their variety of branched and cyclic isomers provide chemically stable hydrocarbon backbones with desirable mechanical properties.

In addition to the hydrocarbon backbones of dimer isocyanate or other dimer acid derivatives, the soft segments of the polyurethanes of the present invention include one or more short to medium chain length hydrocarbon moieties derived from diols or diisocyanates having a molecular weight of less than about 1000. Preferably, these moieties should be derived from medium chain diols or diisocyanates having a molecular weight in excess of about 130 and less than about 1000. The medium chain diols should have a chain length of at least about 8 carbon atoms separating the hydroxyl groups. Appropriate medium chain diols include, for example, 1,10-decane diol, 1,12-dodecane diol, 9-hydroxymethyl octadecanol, and diol derivatives of dimer acid. Aliphatic branched diols such as 9-hydroxymethyl octadecanol, hereafter referred to as $C_{19}$ diol, are believed particularly advantageous. Other diols having generally linear hydrocarbon chain lengths of 8 or more carbons separating the hydroxyl groups and having hydrocarbon side chains are believed to be similarly advantageous.

In some embodiments, it is desirable to include short chain hydrocarbon moieties in the relatively soft segment. These short hydrocarbon moieties may be derived from short chain diols or diisocyanates having chain lengths of 2-6 carbons between their hydroxyl groups. Appropriate diols include cyclohexane-1,4-diol, cyclohexane-1,4-bis(methanol), cyclohexane-1,2-bis(methanol), ethylene glycol, propylene glycol, trimethylene glycol, 1,2-butylene glycol, 1,3-butane diol, 1,4-butane diol, 1,5-pentane diol, 1,2-hexylene glycol, 1,2-cyclohexane diol, 2-butene-1,4-diol, and 1,6-hexane diol, by way of example. If a diol derivative of dimer acid such as dimerol is used to provide the dimer acid backbones, short chain diisocyanates can serve as the source of these short chain hydrocarbon moieties. In some embodiments, inclusion of such short chain hydrocarbon moieties appears to enhance tensile strength without unduly reducing flexibility.

The harder segments of the polyurethanes according to the present invention are preferably fabricated from short to medium chain diisocyanates and short to medium chain diols, both of which preferably have molecular weights of less than about 500. Appropriate diols and diisocyanates include aliphatic straight chain, branched and cyclic diols and diisocyanates, and may also include aromatic diols and diisocyanates. Due to the presence of unresolved biocompatibility issues surrounding the use of materials which may generate aromatic amines in implantable products, use of non-aromatic diols and diisocyanates has been emphasized herein for production of implantable polyurethanes.

Appropriate diisocyanates include, for example, cyclohexane-1,4-diisocyanate, cyclohexane-1,2-diisocyanate, isophorone diisocyanate, hexamethylene-1,6-diisocyanate, tolylene diisocyanates, naphthylene diisocyanates, benzene-1,4-diisocyanate, xylene diisocyanates, and so forth. Diols useful in the more rigid segments of polyurethanes according to the present invention include both the short and medium chain diols discussed above.

As discussed above, polyurethanes according to the present invention comprise alternating softer and harder segments. The segments are linked by urethane groups and the polymers may be terminated by hydroxyl and/or isocyanate groups.

In cases where the relatively softer segments are produced by reacting dimer isocyanate with an excess of diols of the types described above, the softer segments will have the general formula:

—O—($R_1$—OOCNH—D—NHCOO)$_m$—$R_1$—O in which D signifies a hydrocarbon backbone of a dimer acid derivative and $R_1$ signifies a hydrocarbon moiety derived from a diol. The diol may also be a dimer acid derivative. "m" specifies the number of repeating units. Similarly, if an excess of a diol derivative of dimer acid is reacted with diisocyanates to produce the first, relatively softer segments, the general formula would be:

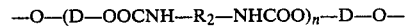
—O—(D—OOCNH—$R_2$—NHCOO)$_n$—D—O— where D signifies a hydrocarbon backbone of a dimer acid derivative and $R_2$ signifies a hydrocarbon moiety derived from a diisocyanate. The diisocyanate may also be a dimer acid derivative. "n" signifies the number of repeating units.

If the softer segments are produced by combining diols with an excess of dimer isocyanate, the general formula would be:

—OCNH—(D—NHCOO—$R_1$—OOCNH-)$_m$—D—NHCO— where D signifies a hydrocarbon backbone of dimer isocyanate, and $R_1$ signifies a hydrocarbon moiety derived from a diol. "m" signifies the number of repeating units.

Similarly, if the softer segments are produced by combining a diol derivative of dimer acid with an excess of diisocyanates, the general formula would be:

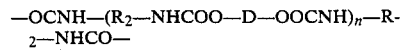
—OCNH—($R_2$—NHCOO—D—OOCNH)$_n$—$R_2$—NHCO— wherein D signifies a hydrocarbon backbone of a diol derivative of dimer acid, and $R_2$ signifies a hydrocarbon moiety derived from a diisocyanate. "n" signifies the number of repeating units.

If the softer segments are produced using an excess of diols, the general formula for the harder segments would be:

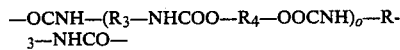

wherein $R_4$ signifies a moiety derived from a diol, and $R_3$ signifies a moiety derived from a diisocyanate of the types described above. "o" signifies the number of repeating units.

If the softer segments were produced using an excess of diisocyanates, the general formula for the harder segments would be $-O-(R_4-OOCNH-R_3-NHCOO)_o-R_4-O-$. $R_3$, $R_4$ and "o" have the same definitions as apply to the formula immediately above.

The softer segments may therefore be described by the more general formula $(-O$ or $-OCNH)-(R_a-U-R_b-U)_m-R_a-(O-$ or $NHCO-)$. In this formula, one of $R_a$ and $R_b$ signifies a hydrocarbon backbone of a dimer acid derivative, U signifies a urethane group, and the other of $R_a$ and $R_b$ signifies a hydrocarbon moiety free of ether and ester groups and having a molecular weight less than about 1000. "m" signifies the number of repeating units. The harder segments may be described by the more general formula $(-O$ or $-OCNH)-(R_c-U-R_d-U)_n-R_c-(O-$ or $NCHO-)$, wherein $R_c$ and $R_d$ signify hydrocarbon moieties free of ether and ester groups, having molecular weights less than about 500, U signifies a urethane group, and "n" signifies the number of repeating units.

In the more general formula set forth above, the hydrocarbon moieties in the softer segment should not be construed to be limited to a particular or single hydrocarbon moiety, but may include one or more different hydrocabon moieties. As discussed above, in some embodiments, a mix of short and medium chain hydrocarbon moieties is believed desirable. With regard to $R_c$ and $R_d$, the choice of separate designators for the $R_c$ and $R_d$ hydrocarbon moieties should not be considered to require that they are differing hydrocarbon moieties, but is intended only to reflect the fact that one of $R_c$ and $R_d$ is derived from a diisocyanate and the other is derived from a diol.

In the embodiments in which a mixture of short and medium chain length hydrocarbon segments is included in the first, relatively softer segment, the softer segment could also be represented as either

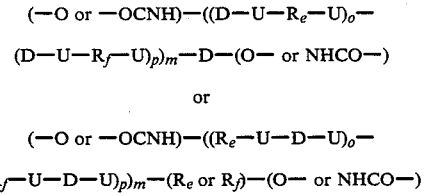

In this more detailed general formula, D signifies a hydrocarbon backbone of a dimer acid derivative and U signifies a urethane group. One of $R_e$ and $R_f$ signifies a hydrocarbon moiety free of ether and ester groups and having a molecular weight of at least about 120 and less than about 1000. The other of $R_e$ and $R_f$ signifies a short chain hydrocarbon moiety, having a chain length of at least two carbon atoms between adjacent urethane groups, and having a molecular weight of less than about 120. "o", "p" and "m" represent the numbers of repeating units.

Polyurethanes according to the present invention may be isocyanate and/or hydroxyl terminated depending on the stoichiometric amounts of monomers used. Slightly hydroxyl terminated polymers are preferred for long term stability of the mechanical properties and molecular weight of the polymer. It appears equally beneficial to "end cap" isocyanate terminated polymers with a monoalcohol to enhance stability. Such "end capped" polymers are also within the scope of the invention.

The polyurethanes of the present invention may be prepared using a two-stage process. The preferred, two-stage process comprises initially combining dimer isocyanate with medium or medium and short chain diols in a ratio of NCO:OH of about 1:2 to 4:5, and more preferably of about 2:3. For certain of the polymers, the stoichiometric ratio of the medium chain to short chain diols preferably is about 1:3 to 4:1. However, useful polyurethanes may be produced using only medium chain or short chain diols in the first stage. The combined reactants of the first stage are allowed to react until substantially no isocyanate functional groups remain to produce a hydroxyl terminated prepolymer.

The second stage comprises the addition of short to medium chain diols and short to medium chain diisocyanates to the adduct produced by the first stage. Preferably, the excess of diisocyanates in the second stage is about equal to the excess of diols in the first stage to provide a generally balanced polymer. The total stoichiometric ratio of first stage to second stage reactants may be adjusted to obtain desired physical properties.

A more detailed understanding of both the material disclosed and the processes for producing the material is set forth in the following examples.

EXPLANATION OF EXAMPLE 1

Two of the diols employed in the following examples are dimer acid derivatives. The first, referred to as "dimerol" is the diol produced by hydrogenation of dimer acids or dimer esters, and has the formula, HO—D—OH, in which D represents the hydrocarbon backbone of dimer acid.

The second dimer acid based diol employed in the following examples is bis(hydroxyethyl) dimer urethane, hereafter referred to as BHEDU. The formula of BHEDU is $HO-CH_2-CH_2-OOCNH-D-NHCOO-CH_2-CH_2-OH$, in which D represents the hydrocabon backbone of dimer acid. BHEDU is produced by the reaction of the diprimary diamine derivative of dimer acid (dimer amine) with ethylene carbonate. This process is discussed in Example 1, below. This process and other corresponding processes for conversion of diamines to urethane diols is discussed in more detail in copending, commonly owned application Ser. No. 251,261, by Coury et al, for Hydroxyl Functional Monomers, filed as of the date of this application, and incorporated herein by reference in its entirety.

EXAMPLE 1

134.65 grams (0.5 eq) of dimer amine were mixed with 44.44 grams (0.505 eq) of ethylene carbonate in a jar and sealed. Initially, the mixture demonstrated two clearly distinguishable phases. The mixture was placed in a forced air oven at 100° C. and shaken every few minutes during heating. After 20 minutes, the mixture had become homogeneous. The mixture was heated at 45° C. overnight. The resulting product, BHEDU, is a yellow, viscous liquid at room temperature. The structural formula set forth above is consistent with the results of IR spectroscopy of thin film samples of the liquid.

EXPLANATION OF EXAMPLES 2–23

The following examples of polyurethanes according to the present invention were made using a variety of procedures. Three basic procedures for laboratory scale reactions are summarized below. Where the procedure used to produce the polyurethane of a specific example deviates significantly from one of these procedures, it is noted. The amounts of reactants used in the examples and the test results of the polymers produced are set forth in Table 1 and Table 2, respectively.

General Procedure A

Stage 1-Reactants used to produce the relatively soft segments, including dimer isocyanate (DDI), a medium chain first diol and optionally a short chain second diol are mixed together in a beaker and alternately stirred, then covered and heated in a nitrogen purged vacuum oven for a few minutes at a time until a homogenous mixture results. Heating temperatures are typically about 250° F. After a homogeneous mixture has been produced and some of the exotherm has been expended, the mixture is catalyzed with a few drops of dibutyltin dilaurate (DBTDL), and the mixture is alternately heated and stirred for a few minutes at a time until thickening of the mixture indicates that the reaction is well underway. The covered mixture in the beaker is then placed back in the oven and left for 1–3 hours at about 250° F. Completion of the first stage can be verified by infrared spectroscopy, as shown by disappearance of the peak representative of the isocyanate functionality at 2260 cm$^{-1}$.

Stage 2-The mixture is removed from the oven and allowed to cool slightly. The diol and then the diisocyanate used to provide the harder segments are added in quick sequence to the mixture. The mixture is covered and heated if necessary to liquify any of the reactants, and stirred until the mixture further thickens and becomes homogeneous. The covered mixture is then placed in an oven at about 250° F. overnight for completion of the reaction.

General Procedure B

Stage 1-Stage 1 is performed in the same fashion as in General Procedure A, above.

Stage 2-After removing the mixture from the oven and allowing it to cool slightly, the diol employed in the harder segments is added to the mixture. The mixture is covered and heated if necessary to liquify the diol and stirred until homogeneous or well dispersed. Then, the diisocyanate is added and the mixture is heated and stirred until the mixture thickens substantially and becomes homogeneous, indicating that the reaction is well underway. The covered mixture is then placed in an oven at about 250° F. overnight for completion of the reaction.

General Procedure C

Stage 1-All reactants used to fabricate the softer segments, including dimer isocyanate, a medium chain first diol, and an optional short chain second diol are alternately heated in a covered container and stirred until homogeneous, as in General Procedure A, above. No catalyst is used. The homogenous mixture is placed in an oven at about 250° F. for a total period of about 2–5 hours. During this period, the mixture is removed approximately every hour and stirred for a few minutes and then covered and replaced in the oven. Completion of the first stage is verified by IR spectroscopy.

Stage 2-After removing the product of stage 1 from the oven, the reactants forming the harder segments are added as quickly as possible, with stirring and heating as necessary to produce a homogenous mixture. The mixture is then catalyzed with 1 or 2 drops of DBTDL, and stirred until thickening of the mixture indicates that the reaction is well underway. The mixture is then returned to the 250° F. oven overnight for completion of the reaction.

In all three procedures, reactants such as cyclohexane-1,4-diisocyanate, 1,6-hexane diol, 1,10-decane diol and 1,12-dodecane diol which have high melting points require special treatment. In order to produce homogeneous or well dispersed mixtures containing these reactants, preheating to melt solid reactants or repeated heating and stirring after mixing with other reactants is typically required.

Uncatalyzed Reactions

The invention have determined that for at least some polyurethane according to the present invention uncatalyzed reactions appear to be preferable. Uncatalyzed two-stage procedures are discussed below in conjunction with Examples 23A–D, 24A–G, 25A–D and 26. It is believed that one of the advantages of polyurethanes according to the present invention resides in the fact that they contain no catalyst residues which might adversely affect their biocompatibility or biostability.

EXAMPLES 2A–E

In these examples, the first stage reactants which yield the softer segments are dimer isocyanate and a medium chain first diol, which in this case is dimerol. The second stage reactants comprising the harder segments are 4,4'-diisocyanatodicyclohexylmethane (Mobay Desmodur-W ® diisocyanate) and 1,4-butane diol. Example 2A was made using General Procedure A. Examples 2B and 2E were produced using General Procedure B. Examples 2C and 2D were produced using General Procedure B. Examples 2C and 2D were produced using General Procedure C. All examples produced were solid elastoplastics. Tensile strength of such polyurethanes can be increased up to a point by increasing the ratio of second stage to first stage reactants (see Example 2E). However, hardness increases and elongation may decrease.

EXAMPLES 3A–D

In Examples 3A–D, the first stage reactants which yield the relatively softer segments include dimer isocyanate, dimerol (first diol) 1,6-hexane diol (second diol). The second stage reactants which form the harder segments are the same as in Examples 2A–E, above. Examples 3B and 3C were made using General Procedure A, while Examples 3A and 3D were made using General Procedure B. After addition to the mixture in stage 1, the 1,6-hexane diol typically solidified. Thus, one or more heating intervals of a few minutes each to liquify the diol were required in order to produce a homogeneous mixture or intimate dispersion. Generally, the polyurethanes according to Examples 3A–D had higher ultimate tensile strength than the polyurethanes of Examples 2A-E, which lacked the second, short chain diol.

EXAMPLES 4A-B

In Examples 4A and 4B, the first stage reactants included dimer isocyanate and BHEDU diol. The second stage reactants were Desmodur-W and 1,4-butane diol. Both Examples 4A and 4B used General Procedure A, with the exception that in stage 1 of Example 4A, the catalyzed mixture was only allowed to remain in the oven for 20 minutes and stage 2 was also catalyzed with dibutyltin dilaurate. The polyurethanes of Examples 4A and 4B are solid elastoplastics.

EXAMPLES 5A-K

The first stage reactants include dimer iscoyanate, BHEDU diol (first diol), and 1,6-hexane diol (second diol). The second stage reactants are the same as those set forth in Examples 4A and 4B above.

Examples 5A and 5B were made using General Procedure A. Examples 5C-5G were made using General Procedure C, with exceptions as noted. In Examples 5C-5F, General Procedure C was modified by heating the stirred, uncatalyzed mixture in stage 1 for 2½ hours, then removing it from the oven and stirring it. The mixture was then returned to the oven for an hour, removed and stirred again and finally heated for an additional hour. In Example 5C, the catalyst was added with the second stage reactants, prior to stirring.

Examples 5H, 5I and 5J are scale-ups of Examples 5A. The scale-up reactions are done in a one gallon stainless steel lined reactor. All reactants used to fabricate the first segment were combined in the reactor with the heating mantle and stirrer on. The stirrer was set at a medium stirring rate, and the reaction vessel temperature was gradually increased and maintained at about 100° to 150° C. Total reaction time for stage 1 was about 5½ hours in Example 5H, and about 3 hours in Examples 5I and 5J. After infrared spectroscopy revealed the absence of isocyanate termination in the product of stage 1, the stage 2 reactants were added to the reactor, diol first, as quickly as possible, with stirring and heat continuing. After an intimate dispersion was achieved, approximately 0.3 grams of dibutyltin dilaurate was added as a catalyst. Stirring and heating continued, with the reaction vessel maintaining a temperature of approximately 170° C. Total time for the second stage was about 1 hour, after which the resultant product was removed from the reactor, covered and allowed to further react in an oven at 250° F.

In general, the products of Examples 5A-K had increased ultimate tensile stength over the products of Examples 4A-B while maintaining other mechanical properties.

EXAMPLES 6A-C

Examples 6A-C explore the use of 1,10-decane diol in the harder segments. The first stage reactants were dimer isocyanate and BHEDU diol. The second stage reactants were Desmodur-W and 1,10-decane diol. Examples 6A-C were formulated using General Procedure C. It should be noted that the high melting point of 1,10-decane diol required repeated heating stages in the second stage in order to melt the diol to allow a homogenous mixture to be produced. The polyurethanes of Examples 6A-6C were strong to moderately strong elastoplastics with moderate elongations.

EXAMPLE 7

In Example 7, the first stage reactants were dimer isocyanate, BHEDU diol (first diol) and 1,6-hexane diol (seond diol). Second stage reactants were Desmodur-W and 1,10-decane diol. Example 7 was produced using General Procedure C with the following exception. In Example 6D, the stirred, uncatalyzed mixture of first stage reactants was heated for 2½ hours, stirred, heated for an hour, stirred again and heated for an additional hour, rather than being stirred every hour. The polyurethane of Example 7 was a strong elastoplastic with moderate elongation at break.

EXAMPLES 8 AND 9

Examples 8 and 9 explore the substitutability of other diols for 1,4-butane diol in the relatively harder segments in polyurethanes generally according to Examples 5A-K, above. First stage reactants were dimer isocyanate, BHEDU diol (first diol) and 1,6-hexane diol (second diol). Both examples were made using General Procedure A. Second stage reactants in Example 8 were 1,6-hexane diol and Desmodur-W. Second stage reactants in Example 9 were ethylene glycol and Desmodur-W. The polyurethanes of Examples 8 and 9 were solid elastoplastics.

EXAMPLES 10-11

Examples 10 and 11 further explore the substitution of other diols for 1,4-butane diol in polyurethanes. In Example 10, first stage reactants were dimer isocyanate, BHEDU diol (first diol), and 1,12-dodecane diol (second diol). In Example 11, the first stage reactants were dimer isocyanate, BHEDU diol (first diol), and 1,4-butane diol (second diol). The second stage reactants in both Examples 10 and 11 were are 1,4-butane diol and Desmodur-W. Both Examples 10 and 11 were produced using General Procedure A and were solid elastoplastics of moderate strength.

EXAMPLES 12-13

Examples 12 and 13 explore the substitution of cyclohexane-1,4-diisocyanate for Desmodur-W in the more rigid segments of polyurethanes according to the present invention. In both Examples 12 and 13, the first stage reactants were dimer isocyanate, BHEDU diol (first diol), and 1,6-hexane diol (second diol) In Example 12, second stage reactants were cyclohexane-1,4-diisocyanate (CHDI) anbd BHEDU diol. In Example 13, second stage reactants were CHDI, 0.076 equivalents of BHEDU diol, and 0.178 equivalents of 1,6-hexane diol. Both examples were produced using General Procedure C. The polymer of Examples 12 had moderate strength and elongation. The polymer produced according to Examples 13 was quite hard and brittle.

EXAMPLES 14A-B

Examples 14A-B explore the replacement of BHEDU diol with C19 diol in the softer segments of polyurethanes according to the present invention.

In Examples 14A and 14B, the first stage reactants were dimer isocyanate and 9-hydroxymethyl octadecanol (C19 diol). The second stage reactants were Desmodur-W and 1,4-butane diol. Examples 14A and 14B were both produced using General Procedure A. Both produced somewhat elastic polymers with moderate strength and elongation.

EXAMPLES 15A-B

Exmples 15A-B further explore the replacement of BHEDU diol as a first stage reactant in polyurethanes with 9-hydroxymethyl octadecanol (C19 diol). First stage reactants were dimer isocyanate, C19 diol (first diol), and 1,6-hexane diol (second diol). Second stage reactants were Desmodur-W and 1,4-butane diol. Both Examples were made using General Procedure C. Examples 15A, was a balanced polymer while Examples 15B had a slight isocyanate excess. Both examples were solid elastoplastics having high tensile strength.

EXAMPLES 26A-K

Examples 16A-K explore the optimization of the most preferred class of polyurethanes in the present application. In all Examples, the first stage reactants were dimer isocyanate, C19 diol (first diol) and 1,6-hexane diol (second diol). The second stage reactants were cyclohexane-1,4-diisocyanate and CC19 diol. The resulting products were tough elastoplastics, having medium to high ultimate tensile strength and elongation. All of Examples 16A-K were produced using General Procedure C. The polyurethanes according to Examples 16A-K are believed to be applicable to a wide variety of implantable medical applications, and are especially optimized for use as insulation on implantable electrical leads.

EXAMPLE 17

Example 17 explores the addition of a small amount of dimer isocyanate to the second stage reactants of polyurethanes generally according to Examples 16A-K. First stage reactants were dimer isocyanate, C19 diol (first diol) and 1,6-hexane diol (second diol). Second stage reactants were CHDI, dimer isocyanate (0.020 Eq.) and C19 diol. Example 17 was produced using General Procedure C. The polymer of Example 17 had moderate ultimate tensile strength and elongation.

EXAMPLE 18

Example 18 explores the effects of substitution of dimerol for C19 diol in the harder segments of polyurethanes generally according to Example 16I. First stage reactants were dimer isocyanate, C19 diol (first diol), and 1,6-hexane diol (second diol). Second stage reactants were CHDI and dimerol). Examples 18 was prepared using General Procedure C. The polymer of Example 18 was a solid elastoplastic of moderate ultimate tensile stength and elongation.

EXAMPLE 19

Example 19 explores the effects of substitution of 1,10-decane diol for C19 in the softer segments of polyurethanes generally according to Example 16I. First stage reactants were dimer isocyanate, 1,10-decane diol (first diol) and 1,6-hexane diol (second diol). Second stage reactants were CHDI and C19 diol. Example 19 was produced using General Procedure C. The polyurethane produced according to Example 19 was a solid elastoplastic of moderate tensile strength.

EXAMPLE 20

Example 20 explores the substitution of BHEDU diol for C19 diol in a polyurethane generally according to Example 16I. First reactants were dimer isocyanate, C19 diol (first diol) and 1,6-hexane diol (second diol). Second stage reactants were CHDI and BHEDU diol. Example 20 was produced using General Procedure C. The polymer of Example 20 was a solid elastoplastic of moderate ultimate tensile strength and elongation.

EXAMPLE 21

Example 21 explores the substitution of 1,10-decane diol for C19 diol in both the softer segments and the harder segments of polyurethanes generally according to Example 16C, above. First stage reactants were dimer isocyanate, 1,10-decane diol (first diol) and 1,6-hexane diol (second diol). Second stage reactants were CHDI and 1,10-decane diol. Example 21 was produced using General Procedure C. The polymer produced was a hard, brittle solid plastic.

EXAMPLES 22A-J

Examples 22A-J explore the effects of the inclusion of trimethylol propane as a cross linking agent in polyurethanes generally according to Examples 16A-J. In all examples, the first stage reactants included dimer isocyanate, C19 diol (first diol), and 1,6-hexane diol (second diol). In Examples 22D-J, the first stage reactants also included a short chain triol, trimethylol propane. For these examples, in Table 1, the 1,6-hexane diol and trimethylol propane are listed in that order, under the column heading "Diol 2". In all examples, the second stage reactants included cyclohexane-1,4-diisocyanate and C19 diol. In Examples 22A-C and G, trimethylol propane was also included in the second stage. For these examples, in Table 1, equivalents of C19 diol and trimethylol propane for these examples are listed in that order under the column heading "Diols". All polyurethanes produced were solid elastoplastics.

Examples 22A-C suggest that including the cross linking agent in the second stage impacts the elongation of the material, without any significant increase in tensile strength. However, as indicated by Examples 22D-F, inclusion of the cross linking agent in the softer segments can in some cases produce a polymer having highly desirable properties including a high tensile strength and a high ultimate elongation. In general, it appears that the physical properties of polymers generally according to Examples 16A-J can be optimized for particular applications using short chain triols as cross linking agents.

EXAMPLES 23A-D

Examples 23A-D explore the consequences of changing the order of addition of reactants in the second stage of polyurethanes generally according to Examples 16A-J to determine whether it is preferable to add the diol and the diisocyanate simultaneously or sequentially. In all examples, the first stage reactants were dimer isocyanate, C19 diol (first diol), and 1,6-hexane diol (second diol). The second stage reactants were cyclohexane-1,4-diisocyanate and C19 diol. The procedure followed for stage 1 in all examples was to add all first stage reactants to a beaker, stirring and heating as necessary until a homogeneous solution was produced and continuing heating at about 150° F. under nitrogen purge until infrared spectroscopy of samples taken from the heated solutions indicated that all isocyanate groups (2260 $cm^{-1}$) had been reacted. At this point, the solutions were removed from the oven and the second stage of the procedure was begun. In Example 23A, the cyclohexane-1,4-diisocyanate was added first, followed immediately by the C19 diol. The reactants were stirred together and allowed to react. In Example 23B, the cyclohexane-1,4-diisocyanate was added first, stirred into the mixture and allowed to react before the C19 diol was added. In Examples 23C and 23D, the C19 diol was added and dispersed in the solution before the cyclohexane diisocyanate was added. In Example 23D, the effects of the use of ½% excess diol were explored in order to determine the effect of a hydroxyl terminated polymer.

As set forth in Table II, testing of Examples 23A–D suggests that the procedure yielding higher tensile strengths in segmented polyurethanes according to Examples 16A–K is to add and disperse the diol first followed by the diisocyanate in the second stage.

EXAMPLES 24A–G

Examples 24A–G explore the relationship between the proportions of short to medium chain diols in the softer segments of polyurethanes generally according to Examples 16A–K. In all Examples, the first stage reactants were dimer isocyanate, C19 diol (first diol), and 1,6-hexane diol (second diol). The second stage reactants were cyclohexane-1,4-diisocyanate and C19 diol.

The procedure used to produce Examples 24A–G was as follows. Prior to weighing, both the medium and short chain diols were heated at 60° C. under 30 in. Hg vacuum for at least 6 hours to liquify the diols and to remove water. The reactants for the first stage, including dimer isocyanate, the medium and short chain diols were added and mixed until homogeneous. The mixture was placed into an oven under a nitrogen atmosphere at about 225° F. and alternately stirred and heated about every 30 minutes for 2½ hours. Completion of the first stage was verified by infrared spectroscopy, which showed disappearance of the isocyanate peak.

Stage 2 began by adding the medium chain diol to the completely reacted product of stage 1, and stirring the mixture until homogeneous. The diisocyanate was then quickly added and dispersed. The mixture was alternately heated at 225° F. and stirred at 5 minute intervals until a homogeneous mixture resulted. The mixture was then stirred about every 15 minutes until the viscosity increased substantially due to polymerization. The polymer was then left in an oven at 225° F. under a dry nitrogen atmosphere for 24 hours to complete the reaction. It should be noted that the above procedure is believed to be particularly useful in that it provides a method for minimizing the effects of extraneous variables and produces polymers with consistent properties from batch to batch.

As suggested by the test results set forth in Table II, it appears that the physical properties of these polyurethanes can be modified by varying the ratio of short to medium chain diols in the first stage of the reaction. Ultimate tensile strength seems to generally fall off with ratios of medium to short chain diols substantially in excess of 1:1 with some slight improvement in elongation at break. Secant modulus also decreases with increasing percentages of the medium chain diol. This provides a convenient method for controlling the flexibility and elasticity of the polymer without unduly reducing utimate tensile strength.

EXAMPLES 25A–D

Examples 25A–D explore a comparison between polyurethanes of the general type set forth in Examples 16A–K compared to polyurethanes made from similar components combined in a single reaction stage. In Examples 25C and D, the first, relatively softer segments were produced from dimer isocyanate, C19 diol (first diol), and 1,6-hexane diol (second diol). The second stage reactants were cyclohexane-1,4-diisocyanate and C19 diol. Examples 25A and B employed the same constituents, in the same amounts, but combined them in a single stage reaction procedure.

The procedure used for Examples 25A and B was to heat the C19 diol and 1,6-hexane diol in a 180° F. oven in order to liquefy them. The dimer isocyanate was then combined with the diols and placed in an oven to warm while the cyclohexane-1,4-diisocyanate was weighed. Approximately two minutes later, the cyclohexane-1,4-diisocyanate was added to the mixture and stirred until dispersed. The mixture was placed in a 180° F. oven and alternately heated and stirred until the cyclohexane-1,4-diisocyanate had melted and a homogeneous mixture was achieved. The reaction was then catalyzed with a few drops of dibutyltin dilaurate and stirred until the increasing viscosity made it impossible to continue, the mixture was returned to the oven at about 150° F. to react overnight.

The two-stage procedure used to produce Examples 25C and D is as follows. The diols were placed into a 180° F. oven to pre-heat and liquefy. The diols and the dimer isocyanate were then combined and stirred. Additional heating was supplied and the mixture was stirred to maintain an intimate dispersion. The sample was repeatedly heated and stirred until polymerization caused the reaction mixture to clarify and thicken. The mixture was returned to the oven at about a temperature of 220° F. under nitrogen purge until infrared spectroscopy of samples taken from the mixture showed no isocyanate termination remaining. The mixture was then removed from the oven, and the cyclohexane-1,4-diisocyanate and C19 diols were added and mixed. The mixture was heated and stirred until the cyclohexane-1,4-diisocyanate was fully melted and dispersed after which the mixture was catalyzed with a few drops of dibutyltin dilaurate. The catalyzed mixture was placed in the oven at 220° F. under vacuum to post-cure overnight.

Testing of the resultant products, as set forth in Table II, suggests that the two-stage process provides a polymer having increased tensile strength and elongation as compared to a single stage process.

EXAMPLE 26

Example 26 compares a polyurethane generally according to Examples 4A or 4B with a polyurethane fabricated using the same ingredients but combined in a single stage process. The reactants used to produce Example 26 were dimer isocyanate, BHEDU diol (first diol), 1,4-butane diol (second diol), and Desmodur-W ®. All of the reactants were weighed and mixed into a single beaker, heated and stirred until homogeneous. The homogeneous mixture was catalyzed with a drop of dibutyltin dilaurate, and the mixture was stirred again to disperse the catalyst. After stirring, the mixture was placed in a 260° F. oven and left to react overnight. A comparison of the test results for Example 26 with the test results for Examples 4A and 4B also suggests that the two-stage procedure disclosed herein produces polyurethanes having increased ultimate tensile strength as compared to a single stage procedure.

EXAMPLE 27

This example 27 illustrates the process of end capping polyurethanes according to the present invention. Example 27 is fabricated by a two-stage process, in which the first stage includes dimer isocyanate, C19 diol (first diol), and 1,6-hexane diol (second diol). The second stage constituents include C19 diol and cyclohexane-1,4-diisocyanate.

The procedure which follows below is a variation of the procedure set forth with regard to Examples 24A-G, above. This procedure represents a scale-up, using a one gallon chemical reactor.

All diols were first dried overnight at 60° C. under 30 inches mercury vacuum prior to use. The reactor was purged with nitrogen for 15 minutes prior to charging. The first stage monomers were weighed in a dry box under nitrogen and quickly added to the reactor in the following order: dimer isocyanate, C19 diol and 1,6 hexane diol. After the monomers were added, vigorous agitation was applied, the heater was turned on and set at 50° C., and the seal pump was turned on and set at 50 PSI. The reactor charging port was sealed and the head space was swept with nitrogen for approximately 5 minutes. When the thermowell temperature of the reactor reached 50° C., the set point was increased to 80° C. This stagewise temperature increase is believed desirable to prevent overheating of the monomers. Reaction temperature was monitored using an average of the thermowell and reactor wall temperatures, and did not exceed 120° C. in the first stage. The reactor head space was swept with nitrogen every 30 minutes for 2 hours. The agitator was stopped and a sample of the prepolymer was removed for infrared analysis. Infrared analysis revealed that the isocyanate peak was absent, showing completion of the first stage.

After completion of the first stage, the C19 diol for the second stage was weighed under nitrogen, added to the prepolymer mixture, and stirred for approximately 5 minutes. The solid cyclohexane-1,4-diisocyanate was weighed under nitrogen and was quickly added to the reactor. The addition port of the reactor was closed and vigorous agitation was again applied. The temperature set point was then increased to 125° C. After approximately 15 minutes, the agitator was turned down to minimum speed to prevent excess foaming of the polymer. During this time, the exothermic reaction caused the temperature to increase to about 140° C. After approximately 30 minutes, the reaction neared completion and the temperature began to drop. When this occurred, the viscosity of the polymer was monitored visually through the addition port of the reactor. The reaction mixture was extruded from the reactor as a liquid when its viscosity became high enough that the agitator blade cut through the polymer, leaving a void which maintained itself for a few seconds before the reaction mixture filled in behind the blade. The reaction mixture was extruded through the valve at the bottom of the reactor under pressure into polypropylene beakers and heated at 200° F. for 24 hours under nitrogen purge.

After heating, the polymer blocks were removed from the beakers and cooled in liquid nitrogen for approximately 20 minutes. The cold blocks were ground to approximately ⅛ inch granules. The granules were then soaked in four times their weight of reagent ethanol in order to end cap any excess isocyanate remaining in the polymer. This end capping procedure is believed valuable in that it removes isocyanate groups which otherwise might react with atmospheric moisture to form urea groups with biuret cross-linking or react with urethane groups to form allophanate cross links within the polymer. After soaking in the alcohol, the polymer was rinsed with clean reagent ethanol and vacuum dried at 50° C. for several days to remove the ethanol. The resultant polymer can be processed by compression and injection molding, extrusion or solution casting.

Polymers according to the above examples may be compression molded according to the following general procedure. However, molding temperatures and procedures actually used in the above examples differed in some cases.

Prior to molding, granules of the polymers are dried under vacuum at 50° C. for about 24 hours. The compression molding process is preheated to 360° F. Typically, to produce a 6 inch by 6 inch sheet of standard thickness (0.025 inches), about 20 grams of polymer granules are used. This amount may be adjusted for other film thicknesses. The granules are molded between ferrotype photographic plates lined with Armalon ® Teflon coated fiberglass cloth. The assembled molding plates and polymer are placed between the platens of the press, and pressed under 20,000 pounds ram force, without preheating of the polymer. Pressure is maintained until the pressure drop between the plates ceases, indicating no further flow of the polymer (typically 30-60 sec). The pressure is then released and the polymer is immediately quenched to room temperature between 1 inch thick aluminum plates. The molded polymer is allowed to sit at ambient conditions for at least 24 hours prior to any testing. If desired, the polymer can be annealed after molding by placing it into a forced air oven at 90° C. for 24 hours.

EXPLANATION OF TABLES

Table 1 illustrates the stoichiometric amounts (equivalents) of the reactants used in the examples. Table 2 illustrates the results of testing of the examples.

Where softening point and other physical properties permitted, the samples were compression molded and tested on an Instron Model 1125 tester to determine ultimate tensile strength (UTS), elongation at break (elong.), and 100% secant modulus (mod). Most examples were polyurethanes having a definite yield point. If measured, the tensile strength at yield (psi) and the elongation at yield (%) are indicated in the "comments" column. Some samples were also tested to determine their mechanical stability by placing them in Ringer's solution at 90° C. to determine whether they would melt at that temperature. Those examples which were so tested are indicated under the "comments" column by the designation "failed 90° C." or "passed 90° C.", with the exception of the polyurethanes of Examples 16A-K, 22A-I, 23A-D, 24A-G and 25A-D. Polyurethanes produced according to these examples are all dimensionally stable in 90° C. Ringers.

The polymers produced according to the examples have been found to be hydrolytically and oxidatively stable, while retaining desired mechanical characteristics. In particular, polyurethanes having the composition of Examples 16F and corresponding scale-up 16K have been tested extensively and compared with Pellethane ®2363-80A polyurethane produced by Dow Chemical. Testing reveals that these polyurethanes of the present invention have ultimate mechanical properties comparable to Pellethane ®2363-80A polyurethane, with a substantial improvement in resistance to oxidative degradation. As a result, polyurethanes produced according to this example are believed to be particularly appropriate for use in implantable devices and are believed to be substantially superior to presently available polyurethane formulations.

FIG. 1 illustrates the effect of exposure of Pellethane ® 2363-80A to various oxidizing and non-oxidizing solutions, showing the change in ultimate tensile strength over time in the solutions indicated. Specimens of the 80A Pellethane ® polyurethane, having an average thickness of 0.9 mm, were treated for 35 days, at 90° C. in oxidative solutions including AgNO₃ (0.1M), AgNO₃ (1.0M), and NaClO (0.1M). Specimens were also treated for the same time at the same temperature in non-oxidizing solutions including acetic acid (0.1M), lactic acid (0.1M), phosphoric acid (0.1M) and Ringer's solution. The results of testing for ultimate tensile strength are set forth in the graph. Pellethane ® 2363-80A polyurethane appears to be subject to degradation in oxidative solutions. This is believed to the problem referred to in the literature related to polyurethanes as metal ion induced oxidation. As indicated in the literature, this is believed to be related to oxidation of the polyether moieties in the Pellethane ® 2363-80A polyurethane.

FIG. 2 illustrates the percent change in ultimate tensile strength versus time for various polyether urethanes, as compared to a polyurethane having the composition of Example 17F. Microtensile specimens having an average 0.9 mm thickness were aged in 1.0M silver nitrate at 90° C. for 35 days. FIG. 2 has been adjusted to reflect plasticization occurring after immersion by setting the base line equal to the ultimate tensile strength of similar specimens aged in Ringer's solution. As such, FIG. 2 discloses the change in tensile strength as compared to specimens aged in Ringer's solution for the same amount of time and at the same temperature. As FIG. 2 indicates, resistance to oxidative environments is substantially improved for the polyurethanes of Example 17F. FIG. 2 also illustrates a rough correspondence between the degree of change of tensile strength and the relative other content of the listed polyether urethanes.

The polymers of the present invention are believed to be a new and useful class of polyurethanes. The method of their production has been particularly optimized to produce these polymers, and is also believed to be novel.

Therefore, in conjunction with the above disclosure, we claim:

TABLE 1

| EX. | Stage 1 (Eq.) DDI | Diol 1 | Diol 2 | Stage 2 (Eq.) Diiso. | Diol |
|---|---|---|---|---|---|
| 2A | .10 | .15 | — | .15 | .10 |
| 2B | .050 | .075 | — | .078 | .050 |
| 2C | .050 | .075 | — | .075 | .050 |
| 2D | .050 | .075 | — | .079 | .050 |
| 2E | .05 | .075 | — | .104 | .075 |
| 3A | .05 | .05 | .025 | .078 | .050 |
| 3B | .05 | .05 | .025 | .078 | .050 |
| 3C | .05 | .025 | .05 | .078 | .050 |
| 3D | .10 | .025 | .125 | .15 | .10 |
| 4A | .10 | .20 | — | .20 | .10 |
| 4B | .05 | .10 | — | .10 | .050 |
| 5A | .10 | .025 | .125 | .15 | .10 |
| 5B | .067 | .030 | .070 | .10 | .067 |
| 5C | .067 | .050 | .050 | .120 | .087 |
| 5D | .080 | .017 | .083 | .20 | .18 |
| 5E | .067 | .050 | .050 | .10 | .067 |

TABLE 1-continued

| EX. | Stage 1 (Eq.) DDI | Diol 1 | Diol 2 | Stage 2 (Eq.) Diiso. | Diol |
|---|---|---|---|---|---|
| 5F | .067 | .050 | .050 | .15 | .117 |
| 5G | .067 | .017 | .083 | .105 | .067 |
| 5H | 2.68 | .69 | 3.33 | 4.04 | 2.68 |
| 5I | 3.25 | .825 | 4.03 | 4.99 | 3.25 |
| 5J | 3.25 | .825 | 4.03 | 4.99 | 3.25 |
| 5K | .1005 | .02555 | .1245 | .1575 | .1005 |
| 6A | .05 | .08 | — | .60 | .57 |
| 6B | .083 | .13 | — | .60 | .55 |
| 6C | .042 | .067 | — | .250 | .225 |
| 7 | .08 | .017 | .083 | .20 | .18 |
| 8 | .067 | .017 | .083 | .10 | .067 |
| 9 | .067 | .017 | .083 | .104 | .067 |
| 10 | .05 | .05 | .05 | .10 | .05 |
| 11 | .067 | .020 | .080 | .104 | .067 |
| 12 | .134 | .050 | .140 | .320 | .254 |
| 13 | .134 | .020 | .180 | .320 | .076,.178 |
| 14A | .050 | .075 | — | .078 | .050 |
| 14B | .050 | .10 | — | .104 | .05 |
| 15A | .134 | .034 | .166 | .204 | .138 |
| 15B | .67 | .17 | .83 | 1.06 | .71 |
| 16A | .134 | .040 | .160 | .20 | .134 |
| 16B | .134 | .10 | .10 | .266 | .20 |
| 16C | .134 | .080 | .12 | .320 | .254 |
| 16D | .134 | .080 | .12 | .311 | .254 |
| 16E | 3.35 | 2.0 | 3.0 | 8.0 | 6.46 |
| 16F | .134 | .040 | .160 | .266 | .20 |
| 16G | .134 | .10 | .10 | .320 | .254 |
| 16H | .134 | .040 | .160 | .320 | .254 |
| 16I | .134 | .060 | .140 | .320 | .254 |
| 16J | .134 | .040 | .160 | .266 | .20 |
| 16K | 3.35 | 1.50 | 3.50 | 8.05 | 6.35 |
| 17 | .134 | .060 | .140 | .300,.020 | .254 |
| 18 | .134 | .060 | .140 | .320 | .254 |
| 19 | .134 | .060 | .140 | .320 | .254 |
| 20 | .134 | .060 | .140 | .320 | .254 |
| 21 | .134 | .080 | .120 | .320 | .254 |
| 22A | .134 | .040 | .160 | .320 | .248,.005 |
| 22B | .134 | .040 | .160 | .320 | .240,.014 |
| 22C | .134 | .040 | .160 | .320 | .229,.025 |
| 22D | .134 | .030 | .160,.010 | .320 | .254 |
| 22E | .134 | .030 | .160,.010 | .266 | .200 |
| 22F | .134 | .020 | .170,.010 | .320 | .254 |
| 22G | .134 | .030 | .160,.010 | .320 | .229,.025 |
| 22H | 3.35 | .60 | 4.0,.40 | 8.0 | 6.35 |
| 22I | .134 | .020 | .160,.20 | .320 | .254 |
| 22J | 3.35 | .75 | .40,.25 | 8.0 | 6.35 |
| 23A | .167 | .075 | .177 | .402 | .317 |
| 23B | .167 | .075 | .177 | .402 | .317 |
| 23C | .167 | .075 | .177 | .402 | .317 |
| 23D | .167 | .075 | .177 | .402 | .319 |
| 24A | .167 | .050 | .202 | .402 | .317 |
| 24B | .167 | .077 | .177 | .404 | .318 |
| 24C | .167 | .101 | .166 | .402 | .303 |
| 24D | .167 | .130 | .126 | .402 | .314 |
| 24E | .167 | .151 | .101 | .402 | .317 |
| 24F | .167 | .177 | .077 | .418 | .332 |
| 24G | .167 | .209 | .050 | .405 | .320 |
| 25A | .167 | .399 | .181 | .402 | — |
| 25B | .167 | 0 | .181 | .402 | — |
| 25C | .167 | .075 | .177 | .404 | .319 |
| 25D | .167 | .075 | .177 | .404 | .319 |
| 26 | .025 | .050 | .025 | .050 | — |
| 27 | 3.28 | 1.47 | 3.48 | 7.89 | 6.22 |

TABLE 2

| EX. | UTS (psi) | Elong (%) | 100% Sec. Mod. (psi) | Hardness (shore) | Comments |
|---|---|---|---|---|---|
| 2A | 1901 | 569 | — | 60A | molded @ 300° F. |
| 2B | 2224 | 507 | 428 | — | |
| 2C | 1373 | 455 | 381 | — | s.p. <250° F. |
| 2D | 1971 | 453 | 363 | — | molded @ 340° F. |
| 2E | 3170 | 457 | 769 | — | |
| 3A | 1576 | 504 | 563 | — | s.p.<250° F. |
| 3B | 3143 | 474 | 722 | — | |
| 3C | 3199 | 358 | 1009 | — | |
| 3D | 2932 | 321 | 1432 | — | |

TABLE 2-continued

| EX. | UTS (psi) | Elong (%) | 100% Sec. Mod. (psi) | Hardness (shore) | Comments |
|---|---|---|---|---|---|
| 4A | 3129 | 272 | 1521 | — | |
| 4B | 3497 | 241 | 1882 | — | |
| 5A | 3710 | 388 | 1613 | 88A | |
| 5B | — | — | — | — | s.p. <250° F. |
| 5C | 5109 | 328 | 1807 | — | failed 90° C. |
| 5D | 3396 | 158 | 2893 | — | passed 90° C. |
| 5E | — | — | — | — | s.p. <180° F. |
| 5F | 4751 | 276 | 2339 | — | |
| 5G | 5700 | 294 | 2331 | — | |
| 5H | 4670 | 331 | 1433 | — | failed 90° C. |
| 5I | 4672 | 293 | 1455 | — | failed 90° C. |
| 5J | 5319 | 300 | 1825 | — | |
| 5K | 4906 | 219 | 1760 | — | failed 90° C. |
| 6A | 4389 | 200 | — | — | yld. 3416 psi, 4% |
| 6B | 6779 | 246 | — | — | yld. 5998 psi, 5% |
| 6C | 6113 | 262 | — | — | yld. 3852 psi, 7% |
| 7 | 5733 | 284 | 2208 | 88A | |
| 8 | 2610 | 367 | 833 | 85A | s.p. <250° F. |
| 9 | 3775 | 291 | 1793 | — | s.p. 190° F. |
| 10 | 2437 | 303 | 826 | — | s.p. <250° F. |
| 11 | 3908 | 302 | 1766 | 86A | molded at 220° F. |
| 12 | 2800 | 380 | — | 90A | yld. 2000 psi, 35% |
| 13 | — | — | — | — | very brittle |
| 14A | 2826 | 452 | 702 | — | |
| 14B | — | — | — | — | s.p. <250° F. |
| 15A | 1742 | 350 | 1662 | 88A | |
| 15B | 4854 | 290 | 2041 | — | |
| 16A | 3731 | 390 | 1508 | 87A | molded @ 350° F. |
| 16B | 3300 | 480 | 1100 | 86A | molded @ 410° F. |
| 16C | 4490 | 489 | 1450 | 89A | molded @ 400° F. |
| 16D | 4000 | 490 | 1550 | 88A,46D | 2% excess OH |
| 16E | 3407 | 464 | 1274 | — | molded @ 300° F. |
| 16F | 4700 | 645 | 1600 | — | |
| 16G | 2700 | 450 | 1260 | — | molded @ 400° F. |
| 16H | 4150 | 456 | 1680 | — | |
| 16I | 3095 | 450 | 1345 | — | |
| 16J | 5000 | 400 | 1700 | 85A | molded @ 390° F. |
| 16K | 4591 | 459 | 1491 | — | |
| 17 | 2040 | 450 | 950 | — | molded @ 400° F. |
| 18 | 2580 | 425 | 1200 | — | molded @ 400° F. |
| 19 | 3200 | 415 | 1540 | — | molded @ 390° F. |
| 20 | 2200 | 243 | — | — | yld. 1774 psi, 34% |
| 21 | — | — | — | — | too hard to test |
| 22A | 3285 | 430 | 1430 | — | molded @ 400° F. |
| 22B | 3535 | 390 | 1685 | — | molded @ 410° F. |
| 22C | 3950 | 400 | 1664 | — | molded @ 420° F. |
| 22D | 5470 | 450 | 1910 | — | molded @ 390° F. |
| 22E | 4000 | 430 | 1530 | — | |
| 22F | 3150 | 380 | — | — | yld. 1700 psi, 33% |
| 22G | 4532 | 400 | 1711 | — | molded @ 430° F. |
| 22H | — | — | — | — | doesn't mold |
| 22I | 4055 | 415 | 1574 | — | molded @ 420° F. |
| 22J | 4020 | 464 | 1551 | — | molded @ 390° F. |
| 23A | 5221 | 520 | 1600 | — | yld. 1175 psi, 8% |
| 23B | 5054 | 554 | 1467 | — | yld. 996 psi, 8% |
| 23C | 5608 | 541 | 1556 | — | yld. 1041 psi, 8% |
| 23D | 6377 | 517 | 1696 | — | yld. 1104 psi, 8% |
| 24A | 5748 | 496 | 1935 | — | yld. 1513 psi, 7% |
| 24B | 5657 | 540 | 1647 | — | yld. 1249 psi, 8% |
| 24C | 6074 | 551 | 1560 | — | yld. 955 psi, 8% |
| 24D | 5818 | 572 | 1347 | — | yld. 892 psi, 8% |
| 24E | 5557 | 588 | 1299 | — | yld. 862 psi, 8% |
| 24F | 5207 | 595 | 1264 | — | yld. 886 psi, 8% |
| 24G | 4367 | 579 | 1138 | — | yld. 819 psi, 8% |
| 25A | 2500 | 322 | 1787 | — | |
| 25B | 2417 | 283 | 1834 | — | |
| 25C | 3676 | 510 | 1558 | — | yld. 1558 psi, 42% |
| 25D | 3610 | 481 | 1377 | — | yld. 1285 psi, 42% |
| 26 | 2465 | 250 | 1233 | — | |
| 27 | 5500 | 525 | 1450 | — | |

1. A segmented polyurethane comprising:
alternating softer and harder segments linked by urethane groups;
wherein said softer segments comprise a polyurethane having the formula (—O or —OCNH)—($R_1$—U—$R_2$—U)$_m$—$R_1$—(O— or NHCO—), wherein one of $R_1$ and $R_2$ signifies a dimer backbone, U signifies a urethane group and the other of $R_1$ and $R_2$ signifies a hydrocarbon moiety free of ether and ester groups and having a molecular weight less than about 1000, and the average value of m is approximately 1 or greater; and
wherein said harder segments comprise a polyurethane having the general formula (—O or —OCNH)—($R_3$—U—$R_4$—U)$_n$—$R_3$—(O— or NHCO—), wherein $R_3$ and $R_4$ both signify hydrocarbon moieties free of ether and ester groups and having molecular weights less than about 500, U signifies a urethane group and the average value of n is approximately 1 or greater.

2. A segmented polyurethane comprising:
alternating harder and softer segments, linked by urethane groups;
wherein said softer segments comprise a polyurethane having the general formula (—O or —OCNH)—($R_1$—U—$R_2$—U)$_m$—$R_1$—(O— or NHCO—), wherein one of $R_1$ and $R_2$ signifies a dimer backbone, U signifies a urethane group, and the other of $R_1$ and $R_2$ signifies a hydrocarbon moiety free of ether and ester groups and having a molecular weight of less than about 1000, said other of $R_1$ and $R_2$ including short chain hydrocarbon moieties having chain lengths of 2-6 between adjacent urethane groups and medium chain hydrocarbon moieties having molecular weight in excess of 100, and wherein the average value of m is 1 or greater; and
wherein said harder segments comprise a polyurethane having the general formula (—O or —OCNH)—($R_3$—U—$R_4$—U)$_n$—$R_3$—(O— or NHCO—), wherein $R_3$ and $R_4$ signify hydrocarbon moieties free of ether and ester groups and having molecular weights less than about 500, U signifies a urethane group, and wherein the average value of n is 1 or greater.

3. A segmented polyurethane comprising:
alternating harder and softer segments linked by urethane groups;
wherein said softer segments comprise a polyurethane having the general formula (—O or —OCNH)—($R_1$—U—$R_2$—U)$_m$—$R_1$—(O— or NHCO—), wherein one of $R_1$ and $R_2$ signifies a dimer backbone, U signifies a urethane group, and the other of $R_1$ and $R_2$ signifies an aliphatic straight, branched, or cyclic chain hydrocarbon moiety including medium chain hydrocarbon moieties having a chain length of at least 8 between adjacent urethane groups, and short chain hydrocarbon moieties having chain lengths of 2-6 between adjacent urethane groups, and wherein the average value of m is approximately 1 or greater; and
said harder segments comprise a polyurethane having the general formula (—O or —OCNH)—($R_3$—U—$R_4$—U)$_n$—$R_3$—(O— or NHCO—), wherein $R_3$ and $R_4$ signify hydrocarbon moieties free of ether and ester groups and having molecular weights less than about 500 and the average value of n is approximately 1 or greater.

4. A segmented polyurethane according to claim 1 wherein said other of $R_1$ and $R_2$ signifies an aliphatic hydrocarbon moiety free of ether and ester groups and having a chain length of at least 8 carbons between adjacent urethane groups.

5. A segmented polyurethane comprising:

alternating harder and softer segments linked by urethane groups;

wherein said softer segments comprise polyurethanes having the general formula (—O or —OCNH)—($R_1$—U—$R_2$—U)$_m$—$R_1$—(O— or NHCO—), wherein one of $R_1$ and $R_2$ signifies a dimer backbone, U signifies a urethane group, and the other of $R_1$ and $R_2$ signifies an ether and ester free hydrocarbon moiety of less than approximately 1000 molecular weight, and includes medium chain aliphatic branched hydrocarbon moieties having a molecular weight of at least about 120 and less than about 1000 and having a branch chain of at least 3 carbons, said other of $R_1$ and $R_2$ also including short chain hydrocarbon moieties having a chain length of 2-6 carbons between adjacent urethane groups, and wherein the average value of m is approximately 1 or greater; and said harder segments comprise polyurethanes having the general formula (—O or —OCNH)—($R_3$—U—$R_4$—U)$_n$—$R_3$—(O— or NHCO—), wherein one of $R_3$ and $R_4$ signifies a hydrocarbon moiety free of ether and ester groups, having a molecular weight of less than about 500 and the other of $R_3$ and $R_4$ signifies an aliphatic branched hydrocarbon moiety having a molecular weight of at least approximately 100 and less than about 1000 and having a chain length of at least 8 carbons between adjacent urethane groups and a branch chain of at least 3 carbons and wherein the average value of n is 1 or greater.

6. A process for the production of a segmented biostable polyurethane, comprising the steps of:

reacting dimer isocyanate with an excess of one or more diols free of ether and esfter groups, said diols including a medium chain first idol having a molecular weight of at least about 120, and less than about 1000, to produce a hydroxyl terminated polyurethane; and reacting said polyurethane with an ether and ester free second diol having a molecular weight less than 500 and with an ether and ester free second diisocyanate having a molecular weight of less than about 500, to produce a substantially balanced polymer.

7. A method according to claim 6 wherein said first step comprises reacting dimer isocyanate with said first diol and with a chain extender diol having a chain length of 2-6 carbons between its hydroxyl groups to produce said hydroxyl terminated polyurethane; and wherein said step of reacting said hydroxy terminated polyurethane comprises reacting said polyurethane with said second diisocyanate and with a medium chain diol having a molecular weight in excess of 120.

8. A method according to claim 6 wherein said step of reacting said hydroxyl terminated polyurethane comprises reacting said polyurethane with said second diisocyanate and a chain extender diol having a chain length of 2 to 6 carbons between its hydroxyl groups.

9. A method according to claim 8 wherein said step of reacting said dimer isocyanate comprises reacting said dimer diisocyanate with said first, medium chain diol and with a chain extender diol having a chain length of 2 to 6 carbons between its hydroxyl groups.

10. A method according to claim 6 or claim 7 or claim 8 or claim 9 wherein said step of reacting said dimer isocyanate comprises reacting said dimer isocyanate with said first diol and with said chain extender diol wherein the stoichiometric ratio of said chain extender diol to said first diol is greater than 1:1.

11. A method according to claim 6 or claim 7 or claim 8 or claim 9 wherein said step of reacting said dimer diisocyanate comprises reacting said dimer isocyanate with said one or more diols such that the OH:NCO ratio of said one or more diols to said dimer isocyanate is approximately 3:2.

12. A method according to claim 6 or claim 7 wherein said step of reacting dimer isocyanate comprises reacting dimer isocyanate with 1,6-hexane diol and 9-hydroxymethyloctadecanol and wherein said step of reacting said hydroxyl terminated polyurethane comprises reacting said polyurethane with 1,4-cyclohexane diisocyanate and with 9-hydroxymethyloctadecanol.

13. A method according to claim 6 wherein said step of reacting dimer isocyanate comprises reacting dimer isocyanate with BHEDU diol, BHEDU being said first diol; and wherein said step of reacting said hydroxyl terminated polyurethane comprises reacting said polyurethane with said second diisocyanate and with a chain extender diol having a chain length of 2-6 carbons between its hydroxyl groups.

14. A method according to claim 6 wherein said step of reacting dimer isocyanate comprises reacting dimer isocyanate with dimerol.

15. A segmented polyurethane comprising:

alternating softer and harder segments linked by urethane groups;

wherein said softer segments comprise polyurethanes having the general formula —O—($R_1$—OOCNH—D-NHCOO)$_m$—$R_1$—O—, wherein D signifies a dimer backbone, $R_1$ signifies a hydrocarbon moiety free of ether and ester groups and having a molecular weight of less than about 1000, and the average value of m is approximately 1 or greater; and wherein said harder segment comprise polyurethane having the general formula —OCNH—($R_2$—NHCOO—$R_4$—OOCNH)$_n$—$R_2$—NHCO—, wherein $R_2$ signifies a hydrocarbon moiety free of ether and ester groups, derived from a diisocyanate and having a molecular weight of less than about 500, $R_3$ signifies a hydrocarbon moiety derived from a diol, free of ether and ester groups and having a molecular weight of less than about 500, U signifies a urethane group, and the average value of n is 1 or greater.

16. A segmented polyurethane according to claim 1 or claim 2 or claim 3 or claim 5 or claim 15, wherein said segmented polyurethane is end capped by reaction of said polyurethane with an alcohol, whereby unreacted isocyanate is eliminated.

17. A process for the production of a segmented biostable polyurethane according to claim 6 comprising the further step of reacting said substantially balanced polymer with an alcohol to eliminate isocyanate which may not have reacted.

* * * * *